United States Patent [19]

Kosson et al.

[11] Patent Number: 5,299,762
[45] Date of Patent: Apr. 5, 1994

[54] INJECTION-COOLED HYPERSONIC LEADING EDGE CONSTRUCTION AND METHOD

[75] Inventors: Robert L. Kosson, Massapequa; Herbert J. Schneider, Plainview, both of N.Y.

[73] Assignee: Grumman Aerospace Corporation, Bethpage, N.Y.

[21] Appl. No.: 776,660

[22] Filed: Oct. 15, 1991

[51] Int. Cl.$^5$ .............................. B64C 1/00
[52] U.S. Cl. .................... 244/117 A; 244/130
[58] Field of Search ............... 244/117 A, 130, 1 N, 244/121

[56] References Cited

U.S. PATENT DOCUMENTS

| | | | |
|---|---|---|---|
| 3,002,716 | 10/1961 | Shaw | 244/130 X |
| 3,128,964 | 4/1964 | LeBel | 244/117 A |
| 3,267,857 | 8/1966 | Lindberg | 244/117 A X |
| 3,785,591 | 1/1974 | Stalmach | 244/117 A |
| 3,908,936 | 9/1975 | Durran | 284/117 A |
| 4,014,485 | 3/1977 | Kinnaird | 244/117 A |
| 4,650,139 | 3/1987 | Taylor | 294/130 |
| 4,966,229 | 10/1990 | Senterfitt | 244/117 A |

Primary Examiner—Jesus D. Sotelo
Assistant Examiner—Christopher P. Ellis
Attorney, Agent, or Firm—William B. Ritchie

[57] ABSTRACT

A leading edge construction for reducing drag on an airfoil, the construction includes a relatively thin solid plate extending forwardly from the air foil, the plate having an exposed top surface and an exposed bottom surface, and a relatively sharply radiused forward edge forming the leading edge of the air foil. The construction further includes slots adjacent to the top and bottom surfaces of the plates for injecting coolant over the top and bottom surfaces of the plate, toward the leading edge, to provide active cooling of the plate for removing stagnant heat lead. The method for reducing drag on a air foil according to this invention includes the steps of providing a relatively thin solid plate extending forwardly from the air foil; the plate having a relatively sharply radiused forward edge forming a leading edge for the air foil, and exposed top and bottom surfaces for cooling; injecting coolant over the top and bottom surfaces of the plate, toward the forward edge; entraining the coolant over the surfaces to actively cool the edge and remove the static heat load.

6 Claims, 8 Drawing Sheets

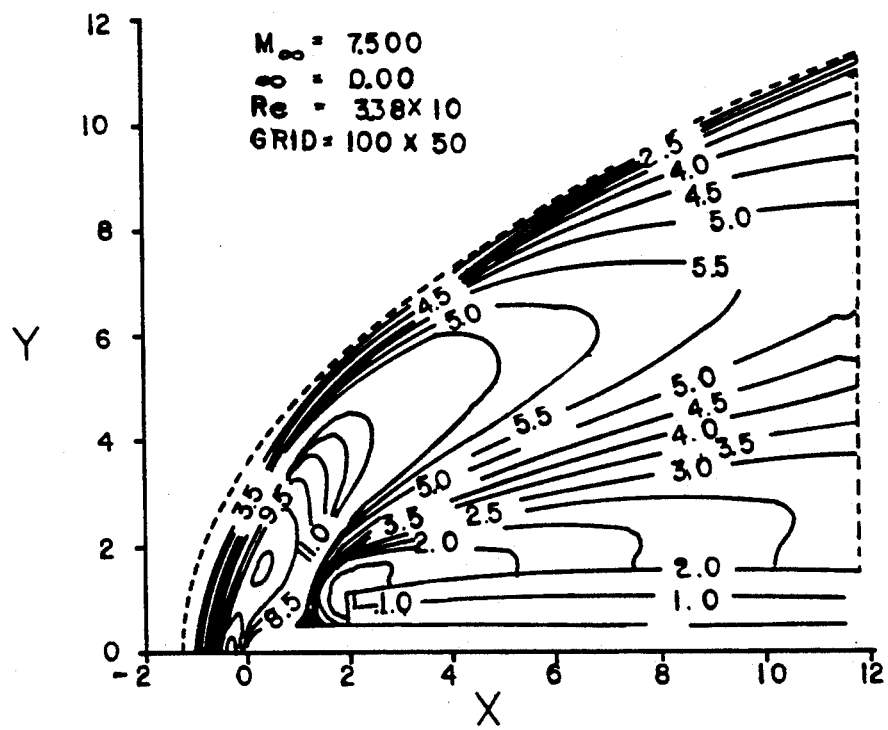
Normalized Temperature With Conduction and Blowing
FIG. 16-A
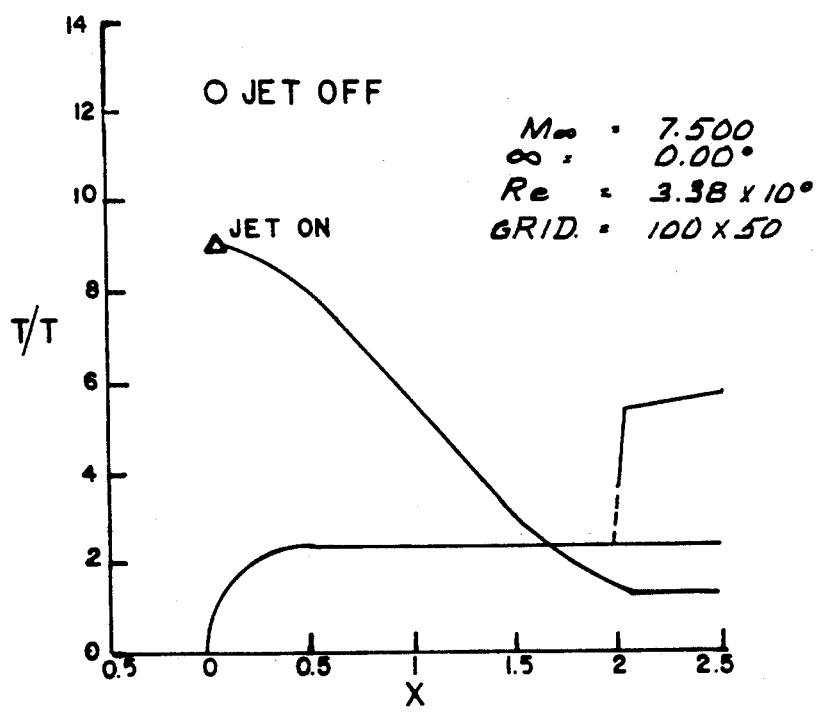
Axial Temperature Distribution
FIG. 16-B

EFFECT OF FIN CONDUCTIVITY ON STAGNATION POINT TEMPERATURE

EFFECT OF JET NOZZLE PRESSURE RATIO ON PRESSURE DRAG

INJECTION-COOLED HYPERSONIC LEADING EDGE CONSTRUCTION AND METHOD

BACKGROUND OF THE INVENTION

This invention relates to a leading edge construction for reducing drag on an air foil.

The net propulsive force available for aircraft operating at hypersonic speeds imposes severe constraints on their design. The propulsive force required to maintain a constant velocity must equal the vehicle drag, and thus drag reduction is a constant consideration in aircraft design. It is well known that drag can be reduced by reducing the radius of the leading edge. However, it is equally well known that a reduction in the radius of the leading edge increases the amount of heat generated per unit area on the leading edge. For any given operating condition, as the radius of the leading edge decreases, the adiabatic recovery temperature of the leading edge increases, and thus the reduction of the radius of the leading edge has been limited by the thermal properties of the material from which the leading edge is constructed. The minimum size of the radius of the leading edge has been limited by the allowable design temperatures for the available materials.

FIG. 1 is a graph showing the total temperatures experienced in typical flight profiles for high speed vehicles, with air speed (in 1000 feet/sec) on the horizontal axis and altitude (in 1000 feet) on the vertical axis. The isothermal curves are non-linear because of real gas effects such as dissociation and ionization. Five points corresponding to flight conditions of interest for hypersonic aircraft are shown in FIG. 1.

The convective heating rate at a stagnation point on an air foil is dependent on velocity, altitude, and the radius of the surface. FIG. 2 is a graph showing the stagnation point heating on a sphere, with altitude (in 1000 feet) on the horizontal axis, and heating rate divided by the square root of the radius at the stagnation point on the vertical axis. There are separate curves for various velocities (in 1000 feet/second). As shown in FIG. 2, the expected heating rate increases with increasing velocity at constant altitude because of the increased energy level of the impinging molecules. As also shown in FIG. 2, the expected heating rate decreases with increasing altitude at constant velocity because of the reduction in atmospheric density. Five points corresponding to the five points shown in FIG. 1 are also shown on FIG. 2. From FIG. 2 it can be seen that the highest heating rate for the five selected points occurs at an altitude of 150,000 feet, and a velocity of 16,000 feet/second.

Analyses have been performed for each of the five selected points to evaluate expected wall temperatures on the leading edge of hypersonic surfaces. These analyses are graphically displayed in FIGS. 3-7. In each of these figures, the radius (in inches) is represented on the horizontal axis, and temperature (in °R) is represented on the vertical axis. Leading edges with cylindrical shapes at 0°, 30°, and 60°, sweep angles are shown. The curve for a sphere (dashed lines) is also shown for reference. These curves confirm that the maximum temperature for the five selected points occurs at an altitude of 150,000 feet, and a velocity of 16,000 feet/second. The temperature graphs of FIGS. 3-7 represent radiation equilibrium values, i.e. they assume that all aeroheat generated is dissipated only by radiation (assuming a surface emissivity of 0.9).

With currently available materials, the maximum allowable temperature for air foil components is no more than about 5000° R. As shown in FIG. 5, at an altitude of 150,000 feet, and a velocity of 16,000 feet/second, this translates into a minimum leading edge radius of about 0.2 inches over a 60° sweep. Any further reduction in the radius to reduce drag under these operating conditions would result in excessive surface temperatures. Thus, unless some cooling means are provided, the leading edge radius for likely hypersonic flight profiles is unduly limited.

The benefits of increasing the sharpness of the leading edge is shown in FIG. 8, in which the fractional change in leading edge radius is represented on the horizontal axis, and drag (in pounds) is represented on the vertical axis. The FIG. 8 graph is based on calculations for an aircraft having a weight of 1200 pounds, a lift/drag (L/D) ratio of 3.5, and a 10° taper angle. Operation at an altitude of 150,000 feet, and a velocity of 16,000 feet/second was assumed. The FIG. 8 graph indicates that, as would be expected, the reduction in drag is a function of the original radius. Thus, the larger the original radius, the larger the potential reduction in drag. From FIG. 8, it can be seen that the 0.2 inch leading edge radius discussed above (which operated at the 5000° R temperature limit) experiences a drag of about 343 pounds. However, the drag approaches about 270 pounds as this radius is reduced toward 0.

The effect of reducing the leading edge radius on the L/D ratio is shown in FIG. 9, in which the change in leading edge radius is represented on the horizontal axis. The FIG. 9 graph was prepared under the same assumptions and conditions as the FIG. 8 graph. The 0.2 inch leading edge radius discussed above, of course, has an initial L/D ratio of 3.5. However, the L/D ratio approaches 4.44 as the leading edge radius is reduced toward 0, indicating that significant improvements in performance are available if the leading edge radius could be reduced beyond the limit imposed by maximum temperature considerations.

The effect of reducing the leading edge radius on the L/D ratio under other operating conditions has also been studied. FIG. 10 is a graph of the change in leading edge radius versus L/D ratio at an altitude of 150,000 feet and a velocity of 6,000 feet/second. FIG. 11 is a graph of the change in leading-edge radius versus L/D ratio at an altitude of 100,000 feet and a velocity of 6,000 feet/second. The FIGS. 10 and 11 graphs illustrate that improvements in performance are available for reductions in leading edge radius under these conditions as well.

SUMMARY OF THE INVENTION

The present invention provides a leading edge construction in which the radius of the leading edge is not limited by the thermal properties of the material or the allowable design temperatures for the material. The construction allows for the reduction of the radius of the leading edge, and thus the reduction of drag. The present invention also provides a method for reducing drag on an air foil. Lastly, the invention provides a method that permits the use of a sharply radiused leading edge on an air foil at air speeds at which the static heat load would normally cause temperatures in excess of allowable design temperatures.

The leading edge construction of the present invention reduces drag on an air foil. Generally, this construction comprises a relatively thin plate extending forwardly from the air foil. The plate has an exposed top surface and an exposed bottom surface. The plate also has a relatively sharply radiused forward edge, which forms the leading edge of the air foil. The construction further comprises a means for injecting coolant over the top and bottom surfaces of the plate, toward the leading edge. The coolant provides active cooling of the plate for removing the static heat load.

The plate may taper in thickness toward the forward edge so that the root or base of the plate is stronger. The means for injecting coolant may include slots in the air foil closely adjacent to the top and bottom surfaces of the plate for injecting coolant over the surfaces of the plate.

The method of the present invention reduces drag on an air foil. Considered another way, the method of the present invention permits the use of a sharply radiused leading edge on an air foil at air speeds at which the static heat load would normally cause temperatures in excess of satisfactory design temperatures. Generally, this method comprises the step of providing a relatively thin plate extending forwardly from the air foil. The plate has a relatively sharply radiused forward edge forming the leading edge for the air foil. The plate also has exposed top and bottom surfaces for cooling. The method further comprises the step of injecting coolant over the top and bottom surfaces of the plate, toward the forward edge, to actively cool the edge and remove the static heat load.

These and other features and advantages will be in part apparent and in part pointed out hereinafter.

BRIEF DESCRIPTION OF THE DRAWINGS

FIGS. 16A–16D show fluid dynamic calculations for a configuration similar to FIG. 14 but employing a rounded leading edge with radius of 0.002 inches.

Corresponding reference numerals indicate corresponding parts through the several views of the drawings.

DETAILED DESCRIPTION OF THE PREFERRED EMBODIMENT

Figure 1:
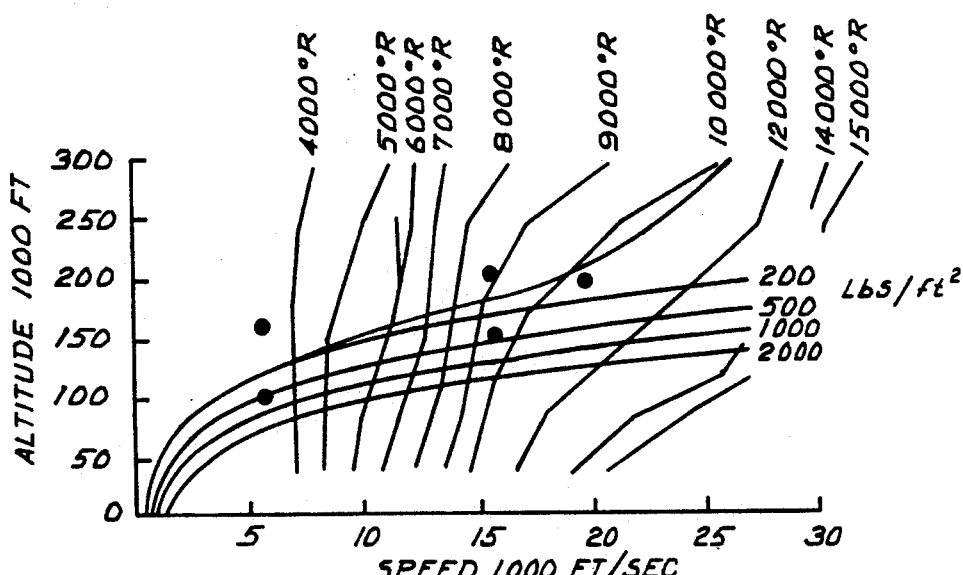
FIG. 1 shows isotemperature curves for anticipated hypersonic flight envelopes on a graph of velocity versus altitude, velocity is in 1000 feet/second and altitude is given in 1000 feet.
Figure 2:
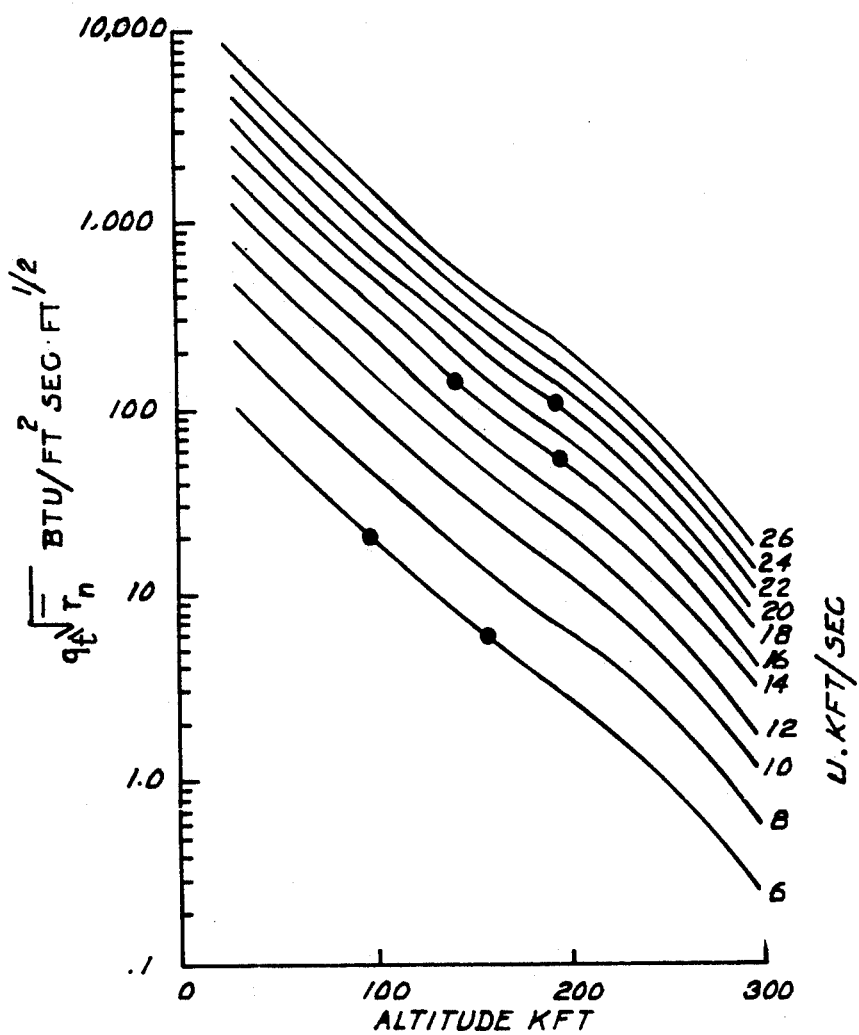
FIG. 2 shows the ratio of stagnation point heating to the square root of the radius of the spheres versus altitude.
Figure 3:
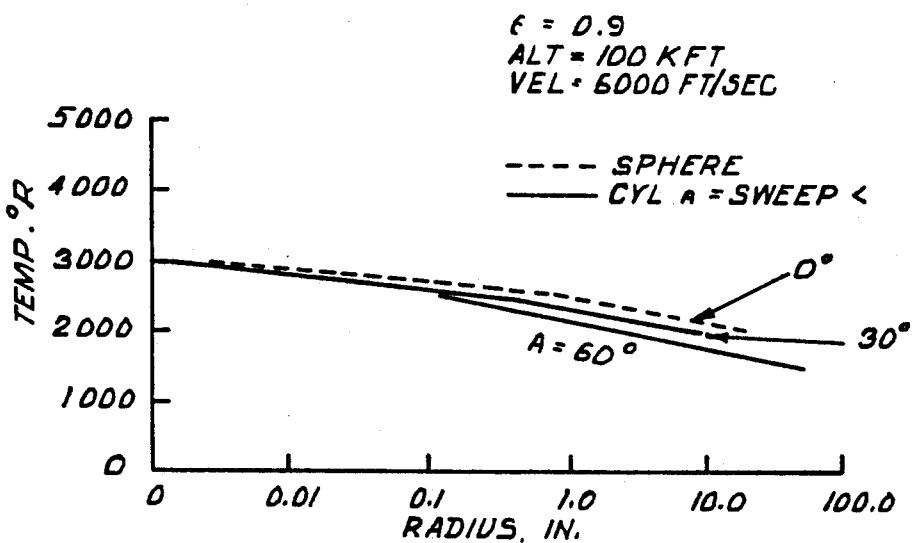
FIG. 3 shows leading edge equilibrium temperature on a graph of radius versus temperature for a cylinder having sweep angles of 0°, 30°, and 60°, and for a sphere, at an altitude of 100,000 feet, and a velocity of 6,000 feet/second, the radius is in inches, the temperature is in °R.
Figure 4:
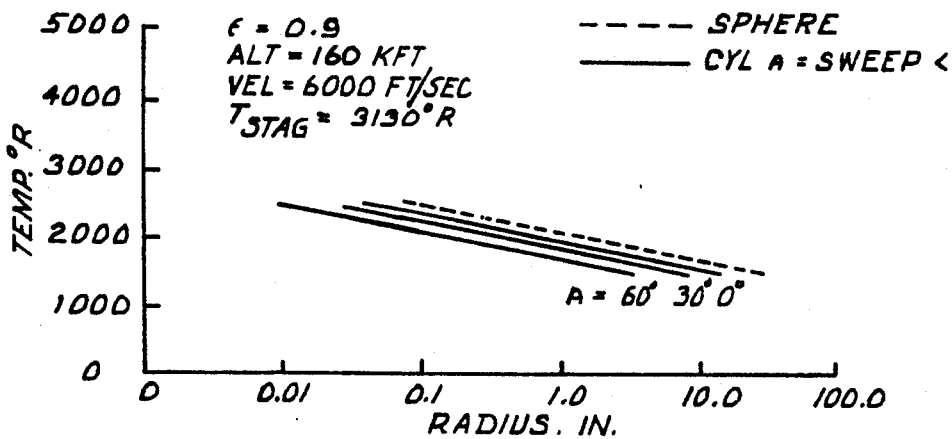
FIG. 4 shows leading edge equilibrium temperature on a graph of radius versus temperature for a cylinder having sweep angles of 0°, 30°, and 60°, and for a sphere, at an altitude of 160,000 feet, and a velocity of 6,000 feet/second, the radius is in inches, the temperature is in °R.
Figure 5:
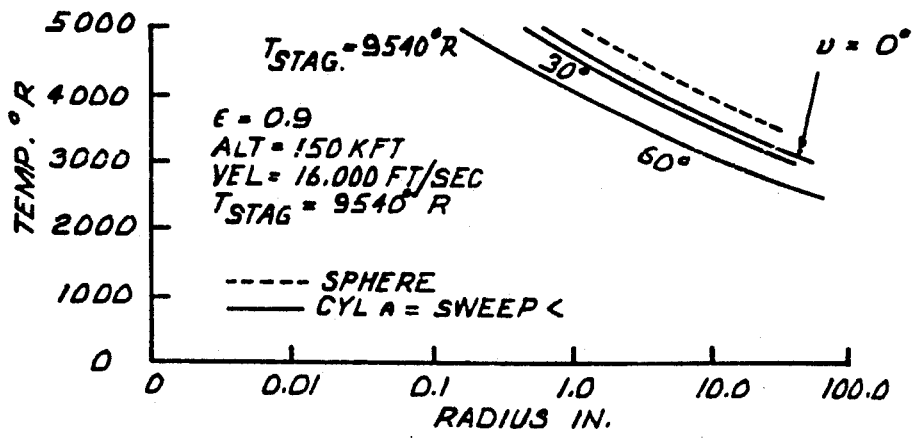
FIG. 5 shows leading edge equilibrium temperature on a graph of radius versus temperature for a cylinder having sweep angles of 0°, 30°, and 60°, and for a sphere, at an altitude of 150,000 feet, an a velocity of 16,000 feet/second, the radius is in inches, the temperature is in °R.
Figure 6:
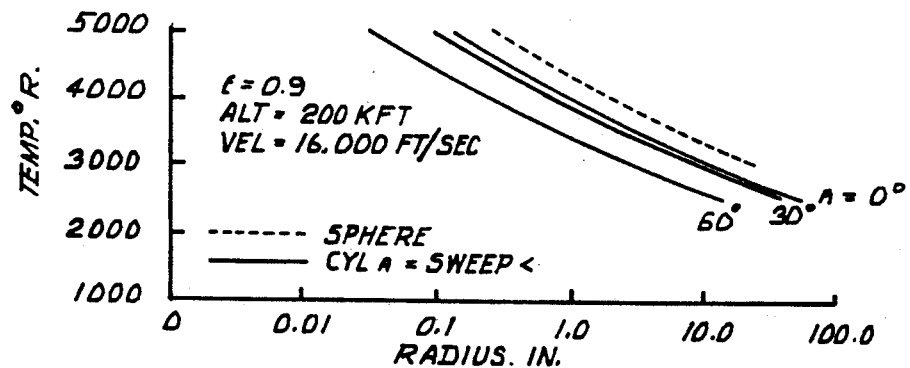
FIG. 6 shows leading edge equilibrium temperature on a graph of radius versus temperature for a cylinder having sweep angles of 0°, 30°, and 60°, and for a sphere, at an altitude of 200,000 feet, and a velocity of 16,000 feet/second, the radius is in inches, the temperature is in °R.
Figure 7:
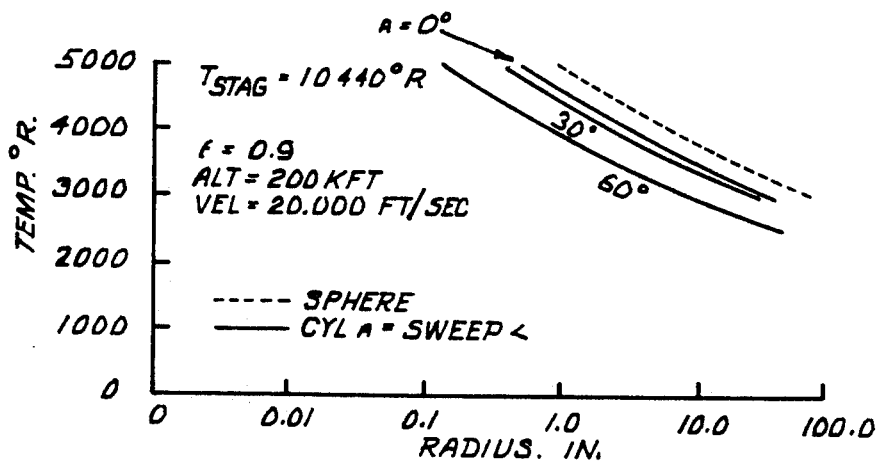
FIG. 7 shows leading edge equilibrium temperature on a graph of radius versus temperature for a cylinder having sweep angles of 0°, 30°, and 60°, and for a sphere, at an altitude of 200,000 feet, and a velocity of 20,000 feet/second, the radius is in inches, the temperature is in °R.
Figure 8:
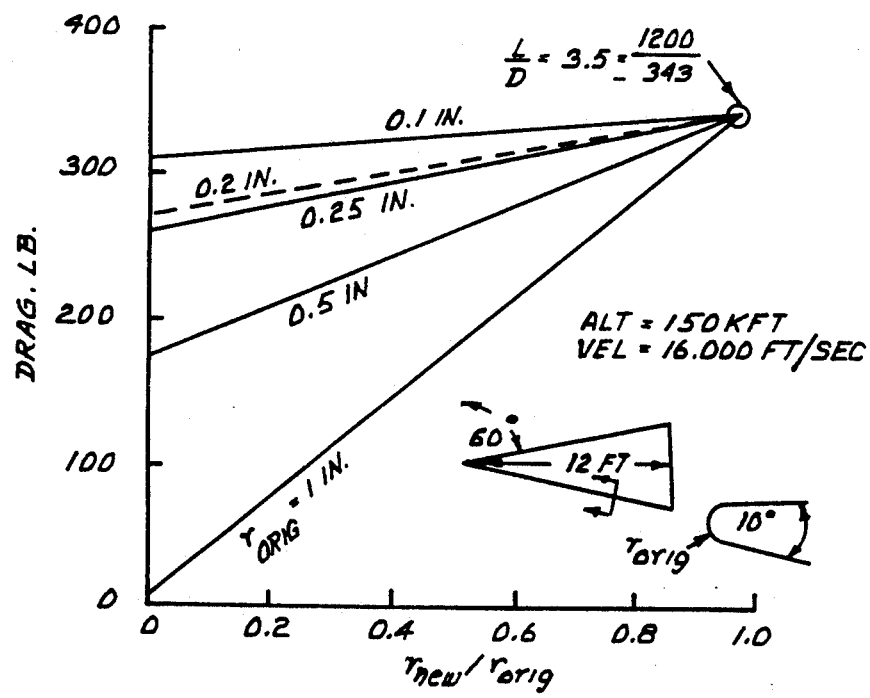
FIG. 8 shows the reduction of drag resulting from the reduction of leading edge radius on a graph of change in radius versus drag, at an altitude of 150,000 feet, and a velocity of 16,000 feet/second, the change in radius is dimensionless, the drag is in pounds.
Figure 9:
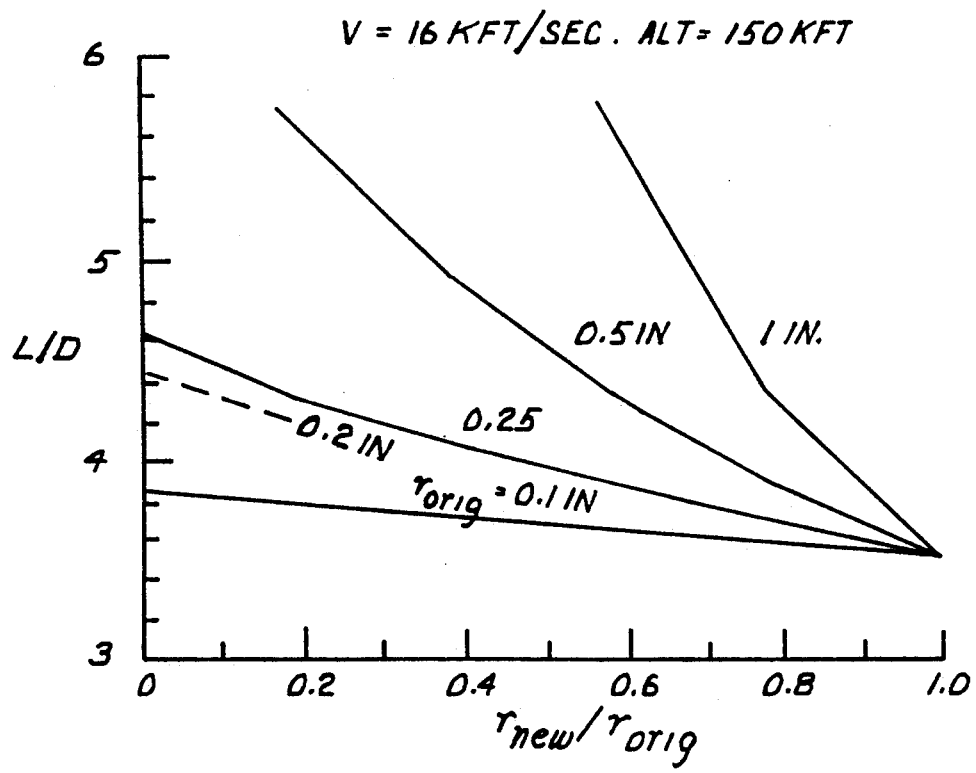
FIG. 9 shows the increase in L/D ratio resulting from the reduction of leading edge radius on a graph of change in radius versus L/D ratio, at an altitude of 150,000, and a velocity of 16,000 feet/second, the change in radius is dimensionless, the L/D ratio is dimensionless.
Figure 10:
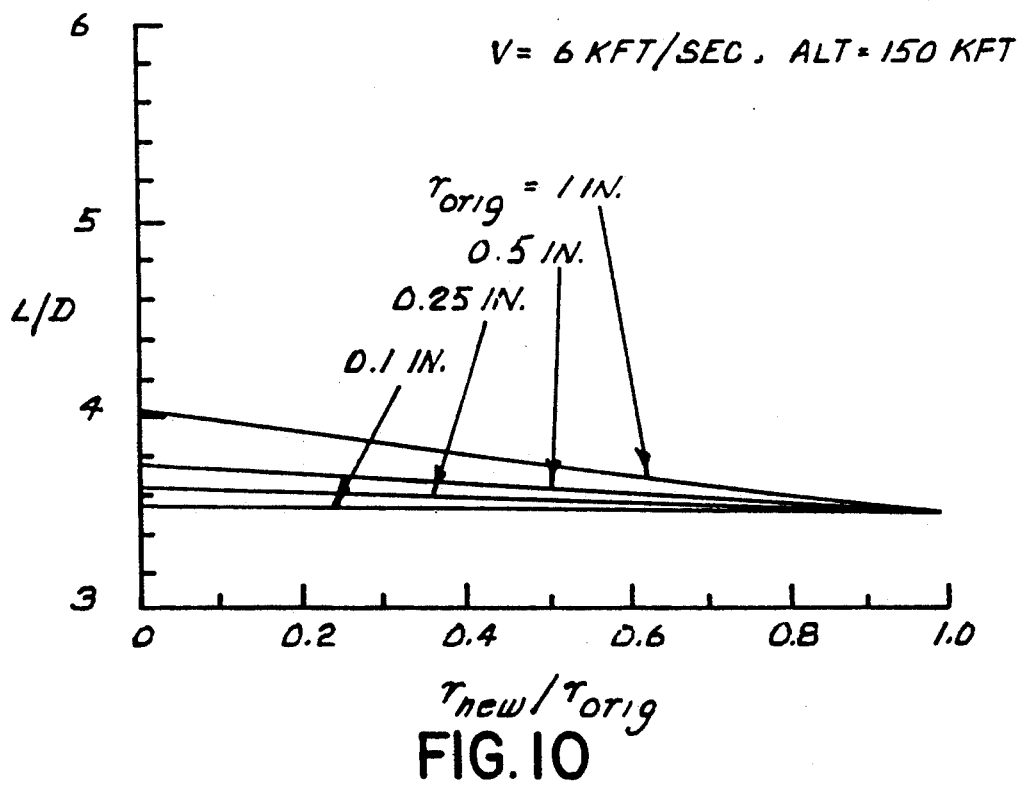
FIG. 10 shows the increase in L/D ratio resulting from the reduction of leading edge radius on a graph of change in radius versus L/D ratio, at an altitude 150,000, and a velocity of 6,000 feet/second, the change in radius is dimensionless, the L/D ratio is dimensionless.
Figure 11:
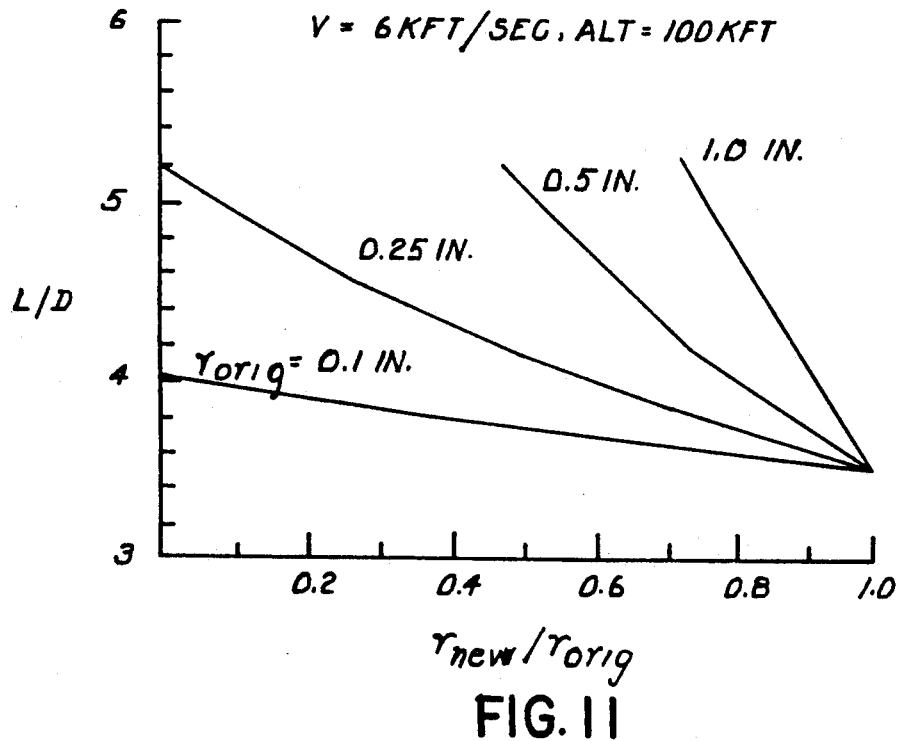
FIG. 11 shows the increase in L/D ratio resulting from the reduction of leading edge radius on a graph of change in radius versus L/D ratio, at an altitude of 100,000, and a velocity of 6,000 feet/second, the change in radius is dimensionless, the L/D ratio is dimensionless.
Figure 12:
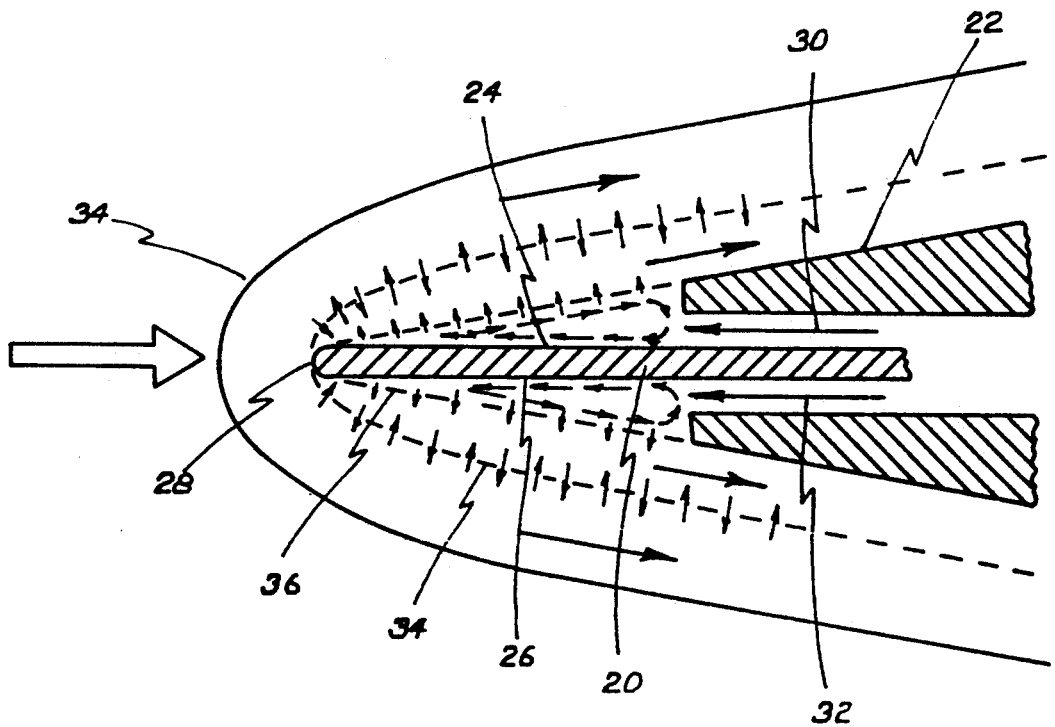
FIG. 12 is a schematic view of the tip of a leading edge construction constructed according to the principles of this invention.

The injection-cooled hypersonic leading edge construction of the present invention is shown schematically in FIG. 12. A key feature of the invention is the use of very small dimensions for all of the components. The leading edge construction comprises a relatively thin plate or fin 20 extending forwardly from the air foil 22. The plate 20 has an exposed top surface 24, and exposed bottom surface 26, and a relatively sharply radiused forward edge 28 forming the leading edge of the air foil 22. There is a slot 30 between the air foil 22 and the top surface 24 of the plate 20. There is also a slot 32 between the air foil 22 and the bottom surface 26 of the plate 20. As illustrated in FIG. 12, a detached shock 34 stands in front of the plate 20, thereby subjecting the forward edge or tip 28 to stagnant aeroheating. Coolant can be injected through the slots 30 and 32, to cool the top and bottom surfaces 24 and 26, respectively, of the plate 20, thereby removing the stagnant heat load.

The injected coolant, because of the very small dimension involved, provides a low Reynolds Number buffer zone between the surfaces 26 and 28 of the plate 20, and the high-speed temperature air stream, enhancing the heat transfer film coefficient along this surface. The relatively large surfaces 26 and 28 provide a large heat transfer surface area, so that the extended plate acts like a fin in which heat is conducted away from the tip and dissipated to the injected coolant. The high speed flow over the surface will entrain the coolant.

Two other significant streamlines are shown in FIG. 12. The zero net mass transfer streamline 34 represents the boundary at which the coolant moving outward is equal to the inward mixing flow of the free stream. The dividing streamline 36 represents the boundary through which the net transfer of mass is equal to the coolant injection rate. As noted above, the region between the dividing streamline and the fin surface provides for high heat transfer coefficients and also acts as a buffer from the high temperature flow.

The rate of injection of coolant will depend on the design parameters of the air foil, and must be low enough so that it does not result in excessive coolant tankage volume requirements. Also, high coolant injection rates may move the shock further away from the leading edge, which should reduce the heat input in addition to increasing the coolant heat capacity rate. However, the displaced shock may result in an increase in drag.

Figure 13:
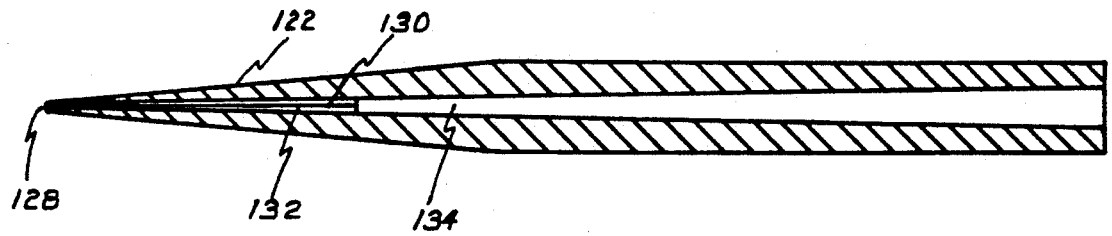
FIG. 13 is a cross-sectional view of the tip of a leading edge construction constructed according to the principles of this invention.
Figure 14:
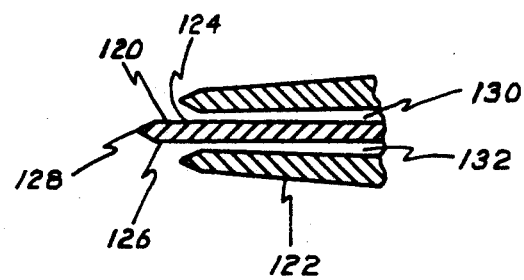
FIG. 14 is an enlarged cross-sectional view of the leading edge construction, showing the tip.

FIGS. 13 and 14 show an embodiment of an injection-cooled hypersonic leading edge construction of the present invention. The leading edge construction comprises a relatively thin plate or fin 120 extending forwardly from the air foil 122. The plate 120 has an exposed top surface 124, an exposed bottom surface 126, and a relatively sharply radiused forward edge 128 forming the leading edge of the air foil 122. There is a slot 130 between the air foil 122 and the top surface 124 of the plate 120. There is a slot 132 between the air foil 122 and the bottom surface 126 of the plate 120. There is a tapering passage 134 through the air foil 122 for the passage of coolant to the slots 130 and 132. The coolant passes through the slots and over the exposed top and bottom surfaces 124 and 126 of the plate 120.

As shown in FIGS. 13 and 14, the plate 120 preferably has a thickness of about 0.004 inches, and a length of about 0.008 inches. The tip is preferably beveled with an included angle of 60°. The slots 130 and 132 have a minimum opening of about 0.002 inches. The portions of the air foil above and below the plate 120 have thicknesses of 0.004 inches. The top and bottom exterior surfaces of the air foil slope at about 5° with respect to the plane of the plate 120. The top and bottom interior surfaces of the air foil (which define the tapering passage 134) slope at about 1° with respect to the plane of the plate 120.

Figure 16C:
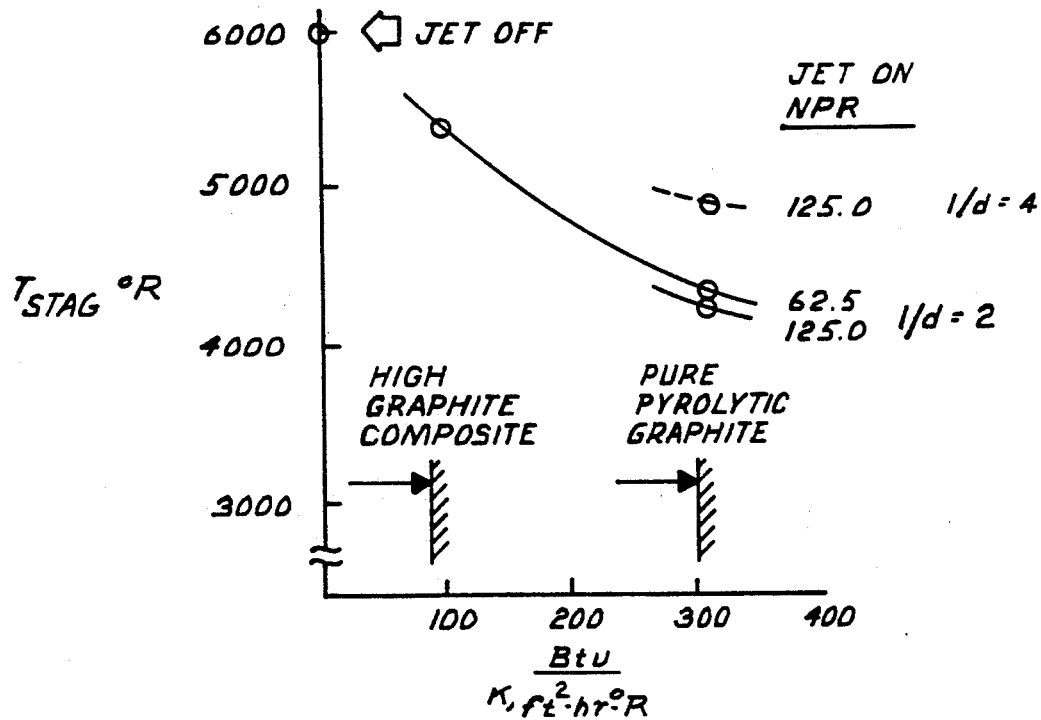
Figure 16D:
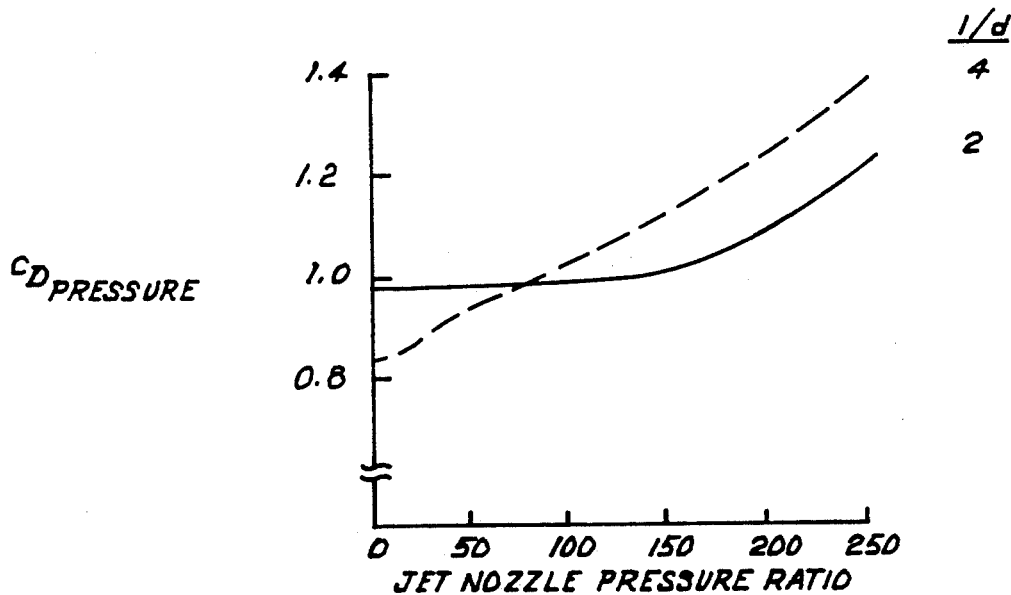

Computational fluid dynamic calculations were made for a configuration similar to FIG. 14 but employing a rounded leading edge with a radius of 0.002 inches. Normalized flow field isotherms for an unswept leading edge at Mach 7.5, with a pyrolytic graphite fin and blowing at a nozzle pressure ratio of 62.5 are shown in FIG. 16A. The normalized temperature distribution on the fin is shown in FIG. 16B. The effect of fin thermal conductivity is shown in FIG. 16C, for two nozzle pressure ratios and two values of fin length. The effect of nozzle pressure ratio on the drag coefficient is shown in FIG. 16D. From FIGS. 16C and 16D, it can be seen that the combination of a nozzle pressure ratio of 62.5, and pyrolytic graphite fin with L/D of 2 can provide a stagnation temperature well below 5000° R with a nose radius of 0.002 inches and virtually no increase in drag coefficient. The coolant flow requirements because of the small slot heights used, are also modest (0.0015 lbs/sec/ft of leading edge).

Figure 15:
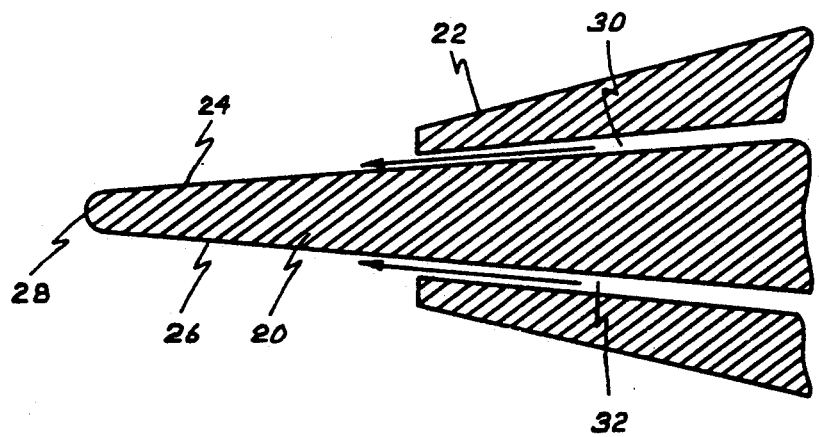
FIG. 15 is a schematic of an alternate construction of a leading edge construction according to the principles of this invention.

A modification of the leading edge construction is shown schematically in FIG. 15. Instead of a flat plate 20', the plate 20' has a tapering configuration for increased strength at its base or root. The plate 20' tapers to the edge 28' with a relatively sharp radius.

The method of the present invention reduces drag on an air foil. Considered another way, the method of the present invention permits the use of a sharply radiused leading edge on an air foil at air speeds at which the static heat load would normally cause temperatures in excess of satisfactory design temperatures. The method comprises the steps of providing a relatively thin plate, e.g. plate 20 or 20' extending forwardly from the air foil, e.g. air foil 22. The plate has a relatively sharply radiused forward edge forming a leading edge for the air foil. The plate also has exposed top and bottom surfaces for cooling. The method further comprises the step of injecting coolant over the top and bottom surfaces of the plate, e.g. through slots 30 and 32, toward the forward edge, to actively cool the edge and remove the static head load.

The method thus reduces drag by allowing the use of a sharply radiused leading edge under conditions where the static heat load would normally cause the temperature to exceed allowable design temperatures.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A leading edge construction for reducing drag on an air foil, the construction comprising:
 a relatively thin solid plate extending forwardly from the air foil; the plate having an exposed top surface and an exposed bottom surface wherein said plate is at least partially detached from said airfoil, and said plate having a relatively sharply radiused forward edge forming the leading edge of the air foil; and means for injecting coolant over the top and bottom surfaces of the plate, toward the leading edge, with the coolant being entrained over said surfaces to provide active cooling of the plate for removing stagnant heat load.

2. The leading edge construction according to claim 1 wherein the plate tapers in thickness toward the forward edge.

3. The leading edge construction according to claim 1 wherein the means for injecting coolant comprises slots int he air foil closely adjacent to the top and bottom surfaces of the plate for injecting coolant over the surfaces of the plate.

4. The leading edge construction according to claim 3 wherein the plate tapers in thickness toward the forward edge.

5. A method of reducing drag on an air foil, the method comprising the steps of:

providing a relatively thin solid plate extending forwardly from the air foil; the plate having a relatively sharply radiused forward edge forming a leading edge for the air foil, and exposed top and bottom surfaces for cooling wherein said plate is at least partially detached from airfoil;

injecting coolant over the top and bottom surfaces of the plate, toward the forward edge;

entraining the coolant over said surfaces to actively cool the edge and remove the static heat load.

6. The method according to claim 5 wherein the plate tapers in thickness toward the forward edge.

* * * * *